Feb. 8, 1955   A. L. CHRISTIANSEN   2,701,674
FISH CANNING MACHINE
Filed Nov. 15, 1951   3 Sheets-Sheet 1

INVENTOR.
ANDREW L. CHRISTIANSEN.
BY
AGENT.

Feb. 8, 1955

A. L. CHRISTIANSEN 2,701,674

FISH CANNING MACHINE

Filed Nov. 15, 1951

INVENTOR.
ANDREW L. CHRISTIANSEN.

BY

*Walter J. Stevenson*

AGENT.

Feb. 8, 1955   A. L. CHRISTIANSEN   2,701,674
FISH CANNING MACHINE

Filed Nov. 15, 1951   3 Sheets-Sheet 3

INVENTOR.
ANDREW L. CHRISTIANSEN.
BY
AGENT.

United States Patent Office
2,701,674
Patented Feb. 8, 1955

2,701,674

FISH CANNING MACHINE

Andrew L. Christiansen, Compton, Calif.

Application November 15, 1951, Serial No. 256,535

12 Claims. (Cl. 226—101)

This invention relates generally to the food canning art, and is concerned particularly with a machine for packing fish in cans preparatory to cooking of the fish. Specifically, the invention pertains to a machine operative to pack predetermined quantities of fish in cans and to deliver the filled cans for further processing.

Fish of the smaller varieties, such as sardines, anchovies, smelts, etc., are packed and sold in cans containing several of the fish, and in order to expedite the packing operation, so as to maintain the cost of production at a minimum, various expedients are employed for placing the fish in the cans or containers. However, such existing devices are subject to many disadvantages, one of which is that the means for transferring the fish from a holder or receptacle into the can is quite inefficient, and unless the fish are first compressed it is very difficult to insert them into the can without jamming the mechanism. Moreover, in such machines for loading or packing fish in cans, it is customary to manually load the fish onto a conveyor, and this is time-consuming and requires the services of several workers, to place the required number of fish in each compartment of the conveyor for insertion into a can.

In addition, the mechanism for transferring the fish from the conveyor into the cans is subject to several disadvantages. For example, in the machine disclosed in my prior Patent No. 2,195,882, issued to me April 2, 1940, the fish are first compressed within a receptacle on the conveyor and a can, carried by the conveyor in line with the receptacle, is then slid over the mass of fish to pack the same within the can. Such forceable packing of the fish has the disadvantage of leaving no room for other bits of fish which may be required to bring the filled can up to the standard of weight content. Furthermore, the filled cans are not properly controlled in their passage from the machine so that their contents are apt to become displaced, at least to the extent of projecting from the cans.

It is therefore an important object of my invention to provide a can filling or packing machine which is highly efficient in operation and one which operates automatically without constant attendance, except to periodically replenish the supply of cans into which the fish are to be packed.

Another object is to provide a machine of the type indicated which is used in connection with a fish cleaning and cutting apparatus, this apparatus functioning to remove the entrails, the heads and tails of the fish and deliver the prepared fish singly through a guide chute. A related object is to provide a packing machine which includes an endless conveyor provided with a plurality of longitudinally-spaced fish-receiving compartments or receptacles, an end of the conveyor being positioned beneath the guide chute to adapt the receptacles to receive the fish delivered from the cleaning and cutting apparatus. In accordance with this invention, the conveyor is driven intermittently from the apparatus in timed relation thereto so as to cause the conveyor to advance, following the placing of a predetermined number of fish in each receptacle, thus avoiding the necessity of attendants counting the fish to be placed in each can. The intermittent drive preferably consists of a pawl-and-ratchet means operated from a cam or eccentric, rotated from a continuously rotating shaft of the cleaning and cutting apparatus which controls the delivery of the prepared fish through the guide chute.

Another object is to provide a machine of the character referred to in which the fish receptacles are formed as horizontal bores in holders carried by the conveyor, the receptacles being of the same diameter as the inside diameter of the cans into which the fish is to be packed, and extending transversely of the conveyor, the receptacles having open ends.

Another object is to provide a machine of this class having means for feeding cans down onto the holders which have support portions for holding the cans, the cam-feeding means being in the form of a magazine for containing a supply of the cans and having a chute at its lower end through which the cans are individually lowered onto the support portions into alignment with the receptacles and with their open ends adjacent an end of the receptacles, the flared rim at the open ends of the cans being retained in a slot in the holders to prevent axial displacement of the cans.

In accordance with this invention, the holders having openings in their upper portions registering with the receptacles and through which the fish may descend into the receptacles. Another object of the invention is to provide closure means for closing the openings after the predetermined number of fish have been introduced into the receptacles, said closure means comprising a plurality of elements carried by an endless conveyor travelable above the main conveyor and parallel to the path of movement thereof, said elements being adapted to enter the openings as the holders move beneath the closure conveyor, so as to retain the fish within the receptacles, the lower surfaces of the closure elements being arcuate and forming continuations of the cylindrical surfaces of the receptacles. In accordance with the invention, the closure conveyor is driven at the same linear speed as the main conveyor and intermittently with the same.

It is another object to provide means for initially and lightly forcing the fish downwardly in the receptacles prior to entrance of the closure elements into the openings of the holders, this means consisting in a roller disposed in advance of the closure means and rollable across the tops of the holders.

Another object is to provide means for transferring the fish from the receptacles into the cans supported by the holders. This transferring means includes a plunger slidable on each holder axially of its receptacle and having a plunger head slidable from a position remote from the can to a position in which it is adjacent the open end of the can so as to push the fish into the can. The transferring means also includes cam means, in the form of inclined bars, fixedly mounted on the frame and adapted to be engaged by follower collars on the plungers, movement of the holders relative to the cam bars causing the plungers to be first slid to transfer the fish from the receptacles into the cans and thereafter retracted to inoperative position. Preferably, the cam bars are of very gradual slope so as to effect slow progressive sliding movement of the plungers. By this provision, the fish are forced relatively slowly into the cans to insure that all the air therein will be expelled and to thus prevent projecting of the fish from the cans when the plungers are withdrawn.

Another object of the invention is to provide a machine of the type indicated having means permitting discharge of the filled cans in vertical position with their open ends uppermost. According to my invention, the cans are supported in horizontal position on the holders with the greater portions of their length projecting laterally from the supports or shelves of the holders, the cans thus being overbalanced in the direction of their closed ends. Retaining means, in the form of a long rod, is carried by the frame and extends longitudinally alongside the conveyor in position to provide a combined support and guide for the outer closed ends of the cans which slide thereon. In the present machine this overbalanced condition of the cans causes the latter to tilt upwardly upon movement of the cans beyond the end of the rod, the rods pivoting on the outer edges of the holders due to their overbalanced closed ends. The machine further includes a discharge conveyor extending alongside the main conveyor and adapted to receive the filled cans in upright position and to convey them toward the discharge end of the machine, this discharge conveyor being driven intermittently in timed sequence from the main conveyor.

A still further object is to provide a conveyor means for transporting the filled cans to other fish processing apparatus, such as a cooker through which the filled cans pass, this transporting conveyor extending transversely of the discharge conveyors of several of the can-packing machines and being adapted to receive the cans from these conveyors through inclined chutes provided for this purpose.

Further objects will appear from the following detailed description, and from the drawings, which are intended for the purpose of illustration only, and in which:

Fig. 2 is a longitudinal sectional view, taken on line 2—2 of Fig. 1;

Fig. 3 is an enlarged longitudinal sectional view through several of the fish holders and closure means;

Figure 1:
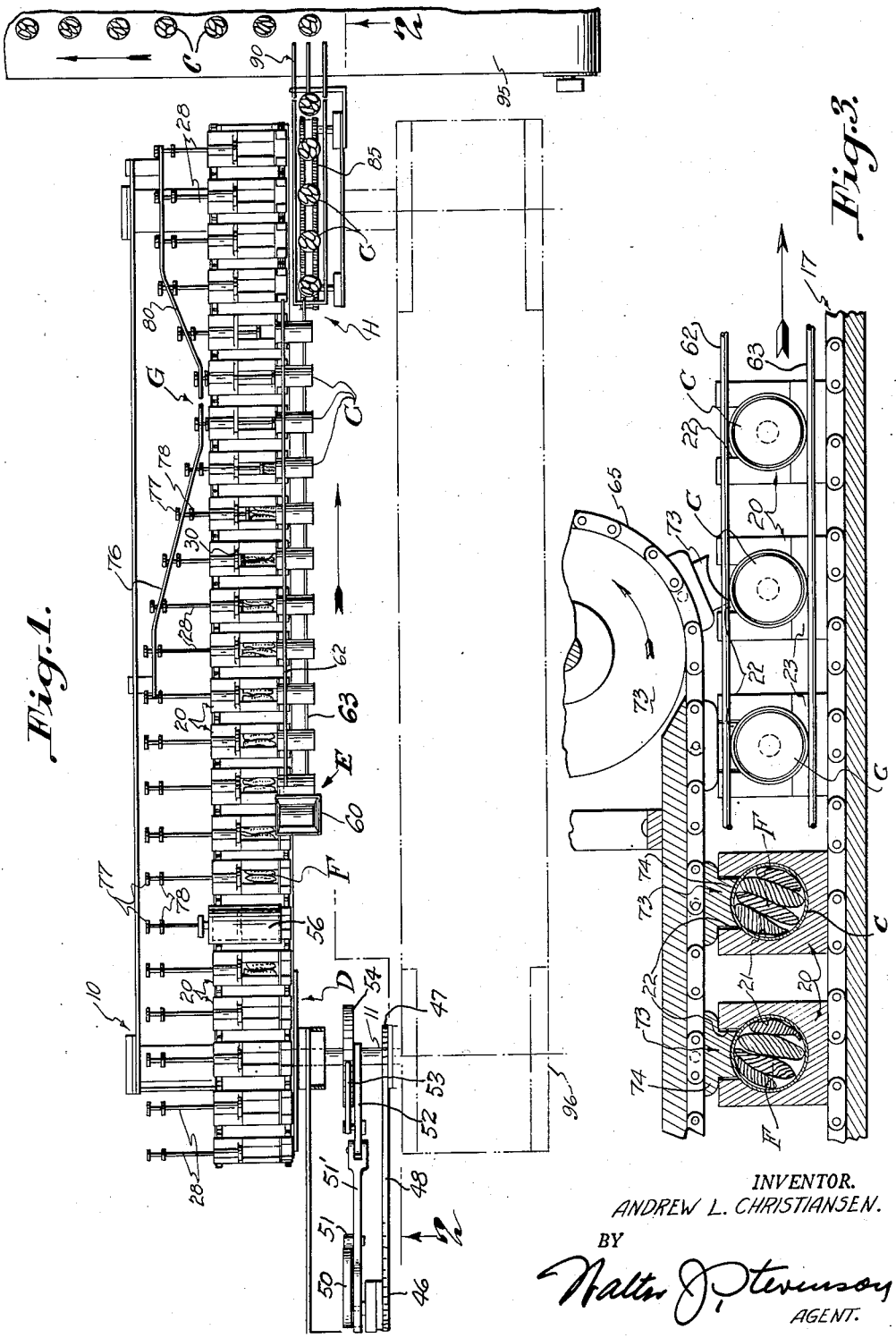
Fig. 1 is a plan view of my improved fish-canning machine or apparatus.

Referring to the drawings in detail, my improved machine includes a relatively long frame 10 having bearings at its ends in which transverse shafts 11 and 12 are rotatable, the shafts carrying respective sprockets 13 and 14 around which the chains 15 and 16 of a main conveyor 17 extend. As shown best in Fig. 5, the chains 15 and 16 carry brackets 18 between which are supported holders 20.

Each holder 20 consists of a metal block, the central portion of which has a bore-like receptacle 21 therein extending transversely of the conveyor 17. The upper part of the central portion is provided with a longitudinal slot or elongate opening 22 through which fish may pass downwardly into the receptacle formed by the bore 21. At one end, the holder block 20 is reduced in height to provide a rest 23, the upper surface of which is concaved to provide a can support 24. Between the central portion and the rest 23 is a transverse slot 25. At the other end of each holder 20 is a bearing block 27 in which the stem 28 of a plunger 29 is slidable, the plunger having a circular head 30 adapted to slide axially within the receptacle 21. The main conveyor 17 is connected to be driven intermittently by means to be presently described.

At the left-hand end of the machine, the conveyor 17 travels beneath the guide chute 35 of a fish-cutting and cleaning machine, indicated generally by the reference numeral 36. The machine 36, which is disclosed in my Patent No. 2,166,939, dated July 25, 1939, has an endless conveyor 37 formed with compartments 38, each adapted to convey a fish through the cutting and cleaning mechanisms. The shaft 39 of the conveyor 37 is driven from an electric motor 40 through the medium of a combined pulley, belt, and gear transmission means 42. The fish F, after being cleaned and cut to remove their heads and tails, are discharged into the chute 35 and a funnel-like guide 43 which directs the fish into the receptacles 21 of the holders 20 when the latter are positioned therebeneath.

It is necessary that a predetermined number of the fish be disposed in each receptacle 21 for packing in a can. For this reason, each holder 20 must remain at rest beneath the guide 43 until the required number of compartments 38 discharge their contents into each receptacle. For example, the drawings illustrate the machine set up for packing four fish in each can, and thus it is necessary that each holder remain at rest beneath the guide 43 for a period necessary to receive the four fish. To effect this intermittent or step-by-step conveyor motion, I provide a cross-shaft 45 which carries a sprocket 46 driven from a smaller sprocket 47 on the shaft 39 by means of a chain 48. The cross-shaft 45 carries a cam 50 which, through a follower roller 51 moves an arm 51' connected to a crank 52 pivoted on the conveyor shaft 11. The crank 52 carries a spring-actuated pawl 53 which engages the teeth of a ratchet wheel 54 fast on the shaft 11. Thus, at the completion of that part of a revolution of the shaft 39 which will deposit four fish into a receptacle 21, the cam 50 actuates the pawl 53 to index the shaft 11 through a part revolution to advance an empty holder 20 to a position beneath the guide 43 to receive four fish. This intermittent feed of the conveyor 17 continues as long as the cleaning and cutting machine remains in operation.

The fish F placed in the receptacles 21 may project above the tops of the holders 20, and to insure against displacement of the fish a resilient roller 56 is mounted for rotation on a bracket 57 above the conveyor, the roller rolling across the tops of the holders to position the fish within the receptacles.

Figure 4:
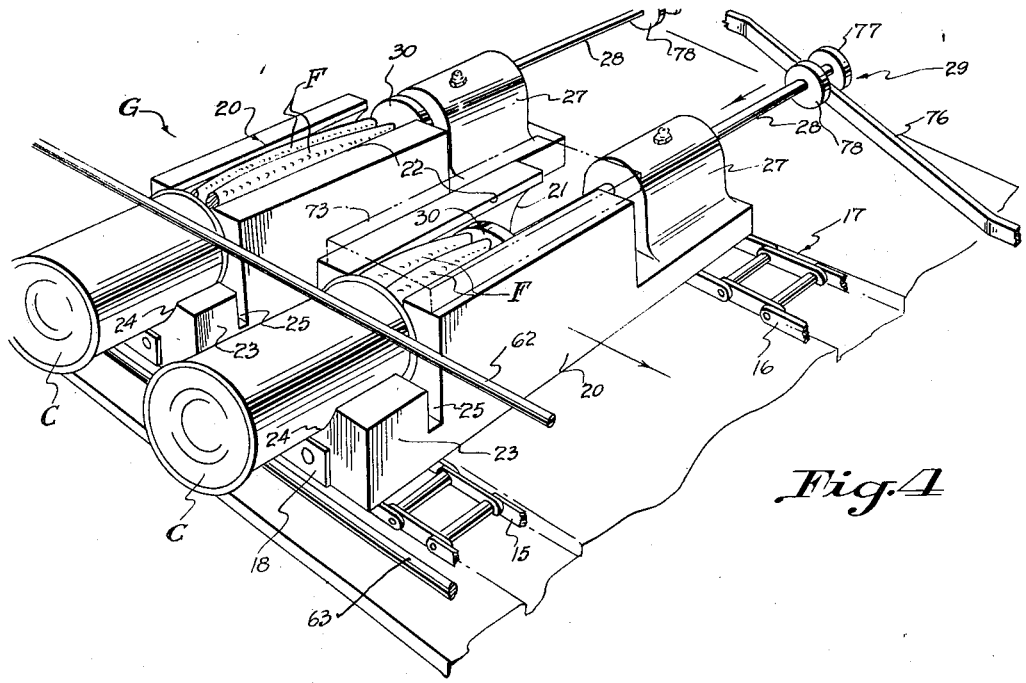
Fig. 4 is a perspective view of a pair of the holders, illustrating the manner in which the fish are transferred from the receptacles into the cans.

As the holders 20 are intermittently advanced, they pass beneath a hopper or vertical magazine 60 which serves to hold a supply of cans C with their axes horizontal. The cans C feed downwardly by gravity and discharge singly from the lower curved end 61 of the magazine 60 onto the concave supports 24 of the holders 20 with their open ends facing the end of the receptacles 21 and with the flared rim or flange at their open ends disposed within the transverse slots 25 of the holders (Fig. 4). As each can thus is mounted on a holder 20, it immediately passes beneath a long bar or guide rod 62 carried by the frame 10 and extending lengthwise of the conveyor 17, the rod overlying the portion of the cans adjacent their inner open ends. A second, similar rod 63 serves to support the outer closed ends of the cans which project laterally from the supports 24. It is to be noted at this point, and by reference to Figs. 4 and 5, that the greater portion of each can C projects from its support 24 so that the can is overbalanced toward its outer closed end. However, the guide rods 62 and 63 serve to retain the cans in place on their supports 24 during travel of the cans through the fish-packing mechanism, to be later described.

Figure 5:
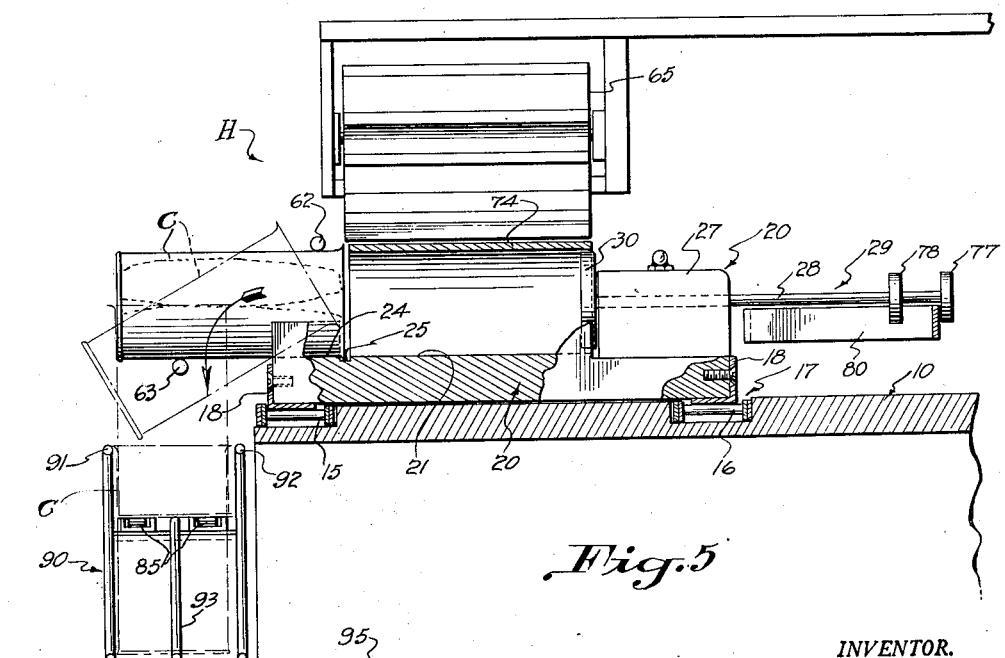
Fig. 5 is an enlarged cross-sectional view, taken on line 5—5 of Fig. 2, showing the plunger fully retracted and the filled can tilting from the holder to be discharged from the machine.

Referring now to Figs. 2 and 3, the present machine includes closure means for closing the upper openings 22 in the tops of the holders 20 during the fish transferring operation. This means comprises an endless conveyor 65 travelable above and parallel to the path of movement of the main conveyor 17. The conveyor 65 is operated intermittently with and by the conveyor 17 through the medium of a gear 66 on the conveyor shaft 12, and idler gear 67 on a cross-shaft 68, a sprocket 69 on the shaft 68, a sprocket 70 on one of the shafts 71 of the conveyor 65, and a chain 72. The conveyor 65 carries a plurality of transverse closure elements 73 which are spaced apart a distance equal to the spacing of the receptacles 21 on the conveyor 17. The elements 73 consist of bars having lower portions 74 adapted to enter the openings 22 of the holders 20 to close the same, the lower surfaces of these portions being curved to conform to the curved surface of the receptacles 21 and to thus form a continuation thereof, as shown in Fig. 3. The closure elements 73 also have lateral flanges at their upper portions adapted to rest upon the top surfaces of the holders 20. As indicated in Figs. 4 and 5, the closure elements 73 project slightly beyond the ends of the receptacles 21 which are adjacent the bearing blocks 27. It will be readily understood from the foregoing that as the conveyor 17 is intermittently driven to advance its holders with a step-by-step motion, the closure elements 73 are likewise advanced to retain the fish F within the receptacles 21.

The means for transferring the fish F from the receptacles 21 into the cans C comprises a fixed cam bar 76 (Figs. 1 and 4), which is mounted on the frame 10 and extends generally longitudinally of the conveyor 17 along a side thereof. The cam bar 76, which has a gradual slope, is adapted to be engaged between spaced follower collars 77 and 78 on the stems 28 of the plungers 29 as the holders 20 are advanced intermittently and successively toward the right, as viewed in Fig. 1. By this means, the plunger heads 30 are pushed into and through the receptacles 21 with a step-by-step motion to thus force the fish F from the receptacles into the cans C through their open ends. Due to this relatively slow motion, the air within the closed ends of the cans C is effectively expelled so that there is no tendency for the fish to be forced outwardly from the cans where the plunger heads are withdrawn.

After the fish have been packed in the cans as explained above, the plunger heads 30 are retracted through the medium of a second cam bar 80 which diverges laterally away from the conveyor 17 (Fig. 1). This cam bar may be located either alongside the upper portion of the conveyor 17, as herein shown, or alongside the bottom or return portion thereof when it is desired to conserve space. In either case, the cam bar 80 acts through the follower collars 77 and 78 to move the plungers 29 of successive holders 20 laterally so as to withdraw the heads 30 from the receptacles 21 and thus permit refilling of the receptacles as the latter again move into position beneath the guide means 43.

The guide rods 62 and 63 terminate at a point slightly in advance of the fish transferring station (Fig. 2) so that when the filled cans reach this point the cans, which as previously explained are overbalanced, tilt from the horizontal position shown by full lines in Fig. 5, in the manner indicated by the dot-and-dash lines, and finally assume the vertical position designated by the dash lines in this view. The filled cans C, upon reaching such upright position with their open ends uppermost, come to rest upon a discharge conveyor 85 extending alongside the conveyor 17. The conveyor 85 is preferably advanced intermittently with the conveyor 17 by means of sprockets 86 and 87, and a chain 88. The conveyor 85 extends to the right-hand end of the machine, and at the location where it reverses its direction a guide chute 90 is provided. This chute may consist of three downwardly sloping rods 91, 92, and 93, which engage the sides and bottom of each can C to allow the latter to slide longitudinally and downwardly onto a cross conveyor 95 which serves to transport the filled cans to other processing apparatus, such as a cooking unit (not shown) where the packed fish are cooked. The conveyor 95 may extend along the discharge ends of several of the can packing machines to receive the filled cans for processing. Referring to Fig. 1, the improved fish packing machine is preferably constructed in duplicate, the conveyor 17 and associated parts being duplicated as indicated in phantom at 96.

It will be observed from the foregoing that my machine is fully automatic in operation, it being only necessary to replenish the supply of cans in the hopper. In operation, the conveyor 17 is intermittently advanced in timed relation to the travel of the conveyor 37 and, through the transmission means 42, the conveyor 17 is moved after a holder 20 thereon has received the required number of fish F at the fish-receiving station D. The conveyor 17 then advances its holders 20 successively through the can-receiving station E to receive cans thereon, and from this station the holders are moved successively to the combined closure operating and can-filling station G where the fish are transferred from the holders into the cans C. After passing this station, the filled cans travel to the can-discharging station H where the guide rods 62 and 63 terminate to allow the cans to tilt from the holders 20 onto the discharge conveyor 85 which acts to transfer them onto the cross-conveyor 95. It is thus seen that the fish and cans travel successively and sequentially through the several stations named above, to produce filled cans suitable for further processing in the canning establishment. It will be readily understood that by varying the speed ratio between the conveyor 37 and the cam means 50 the holders 20 may be retained beneath the guide 43 for periods sufficient for them to receive any number of the fish from the cutting and cleaning means.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by modified means.

I claim as my invention:

1. A fish canning machine, including: a movable conveyor means having a holder thereon providing an elongate horizontal receptacle for containing fish with the fish extending lengthwise thereof, said receptacle having an opening in its upper side through which the fish can be loaded into the receptacle, said holder having can supporting means supporting an open-ended can in axial alignment with the receptacle and with the open end of the can adjacent an end of the receptacle and with the closed end of the can projecting axially from the supporting means and overbalancing the portion of the can supported by said supporting means; retaining means extending along the path of movement of the conveyor and overlying the supporting means and operative to retain the can thereon during movement of the conveyor; a plunger head carried by said holder and slidable axially in the receptacle thereof; plunger operating means, operable in response to movement of the conveyor means, for sliding the plunger head from an inoperative position outside the receptacle in a direction to force the fish from the receptacle into the can through the open end thereof; vertically movable closure means, operable when in lower position, to close said opening so as to compact the fish within the confines of the receptacle, said closure means overlying the plunger head in close association therewith when the latter is in its inoperative position; and plunger operating means, operable in response to movement of said conveyor means, for sliding the plunger head, said retaining means terminating at a selected location in the path of movement of the filled can so as to release the can to permit it to tilt from the supporting means, due to its overbalanced setting on the supporting means.

2. A machine as defined in claim 1 in which said holder has a bore extending horizontally and transversely of the conveyor and providing said receptacle, and has a longitudinal slot in its upper surface communicating with the bore and providing an entrance opening through which the fish can be lowered into said bore, said closure means being movably disposed above the conveyor and movable to a position to close said opening and overlie the plunger head.

3. A machine as defined in claim 2 in which said plunger operating means comprises a fixed elongate cam extending lengthwise of the conveyor, and follower means connected to said plunger head and engaging said cam.

4. A machine as defined in claim 3 in which said cam consists of at least one bar extending alongside said conveyor and sloping transversely of the conveyor in a substantially horizontal plane.

5. A machine as defined in claim 4 in which said plunger head has a stem projecting from said holder and said follower means comprises a pair of spaced collars adjustably secured to said stem and straddling the sides of said cam bar.

6. A fish canning machine, comprising: a frame; a conveyor movable in a horizontal path on the frame successively past a fish receiving station, a can receiving station, a can filling station and a can discharging station, said conveyor having a plurality of holders providing fish receiving receptacles having entrance openings in their upper sides; movable plunger means mounted directly upon the holders for forcing the fish axially from the receptacles, said holders having integral means to support cans thereon with the open ends of the cans in alignment with said receptacles and plunger means; fish loading means at said receiving station operative to direct fish downwardly through said openings into said receptacles; can supplying means at said can receiving station operative to place cans on said holders in the aforesaid position; plunger operating means fixed to said frame at said can filling station and operative in response to movement of the holders relative to the operating means to move said plunger means in a direction to force the fish from said receptacles into said cans; can discharging means at said discharging station operative to discharge the filled cans successively from the respective holders; a first operating means for continuously operating said fish loading means; and a second operating means driven from said first operating means for intermittently moving said conveyor.

7. A fish canning machine, comprising: a frame; a conveyor movable in a horizontal path on the frame successively past a fish receiving station, a can receiving station, a can filling station and a can discharging station, said conveyor having a plurality of holders providing fish receiving receptacles having entrance openings at their upper sides; movable plunger means carried directly by the holders for forcing the fish axially from the receptacles, said holders having integral means to support cans thereon with the open ends of the cans in alignment with said receptacles and plunger means; fish loading means at said receiving station operative to direct fish into said receptacles through their said openings; can supplying means at said can receiving station operative to place cans on said holders in the aforesaid position; plunger operating means fixed on said frame at said can filling station and operative in response to movement of said holders relative to said operating means to move said plunger means in a direction to force the fish from said receptacles into said cans; guide rod means extending lengthwise of the conveyor and operative to retain the cans in place on said holders, said rod means terminating short of said discharging station so as to release said cans; and operating means operative to intermittently move said conveyor so as to advance its said holders successively past all of said stations in the order named.

8. A fish canning machine, comprising: a frame; a conveyor movable in a horizontal path on the frame successively past a fish receiving station, a can receiving station, a can filling station and a can discharging station, said conveyor having a plurality of holders providing fish receiving receptacles having inlet openings in their upper sides; movable plunger means carried directly by the holder for forcing the fish axially from the receptacles, said holders having integral means defining recesses for supporting cans thereon with the open ends of the cans in alignment with said receptacles and plunger means; fish loading means at said receiving station operative to direct fish into said receptacles through their said inlet openings; can supplying means at said can receiving station operative to place cans on said holders in the aforesaid position; plunger operating means fixed on said frame at said can filling station and engageable with said plunger means to move said plunger means in a direction to force the fish from said receptacles into said cans; guide rod means extending lengthwise of the conveyor and operative to retain the cans in place on said holders, said rod means terminating short of said discharge station so as to release said cans; a first operating means for continuously operating said fish loading means; and a second operating means operative in response to the placing of a predetermined number of fish in each of said receptacles by said loading means to intermittently move said conveyor so as to advance its said holders successively past all of said stations in the order named.

9. A fish canning machine, comprising: a frame; a conveyor movable on the frame successively past a fish receiving station, a can receiving station, a can filling station and a can discharging station, said conveyor having a plurality of holders providing fish receiving receptacles and movable plunger means on the holders for forcing the fish from the receptacles, said holders being adapted to support cans thereon with the open ends of the cans in alignment with said receptacles and plunger means; fish loading means at said receiving station operative to direct fish into said receptacles; can supplying means at said can receiving station operative to place cans on said holders in the aforesaid position; plunger operating means at said can filling station operative to move said plunger means in a direction to force the fish from said receptacles into said cans; can discharging means at said discharging station operative to discharge the filled cans successively from the respective holders; a directing chute incorporated in said fish loading means for directing fish into the receptacles disposed therebeneath; an operating means for continuously operating said fish loading means; and pawl-and-ratchet means driven from said operating means for intermittently moving said conveyor so as to advance its said holders successively past all of said stations in the order named.

10. A fish canning machine, comprising: a frame; a conveyor movable on the frame successively past a fish receiving station, a can receiving station, a can filling station and a can discharging station, said conveyor having a plurality of holders providing fish receiving receptacles and movable plunger means on the holders for forcing the fish from the receptacles, said holders being adapted to support cans thereon with the open ends of the cans in alignment with said receptacles and plunger means, said holders having openings communicating with said receptacles and through which the fish can be introduced into the receptacles by said loading means; fish loading means at said receiving station operative to direct fish into said receptacles; can supplying means at said can receiving station operative to place cans on said holders in the aforesaid position; plunger operating means at said can filling station operative to move said plunger means in a direction to force the fish from said receptacles into said cans; vertically movable closure means at said can filling station operative to close said openings prior to and during movement of said plunger means to transfer fish from the receptacles into the cans; can discharging means at said discharging station operative to discharge the filled cans successively from the respective holders; a first operating means for continuously operating said fish loading means; a second, pawl-and-ratchet, operating means driven from said first operating means for intermittently operating said conveyor; and a third operating means driven from said second operating means for intermittently operating said closure means, all of said operating means operating in timed sequence.

11. A machine as defined in claim 10 in which said holders have openings communicating with said receptacles and through which the fish can be introduced into the receptacles by said loading means, and in which said closure means includes an endless conveyor travelable above and parallel to the path of movement of said holders and having a plurality of closure elements thereon insertable in said openings of successive holders movable therebeneath so as to close the same, said closure elements having arcuate surfaces at their lower ends forming continuations of the receptacles and having lateral flanges restable upon the upper surfaces of the holders.

12. A machine as defined in claim 8 including: a roller rotatable on the frame above said conveyor and rollable across said holders passing therebeneath so as to press the fish downwardly through said inlet openings into said receptacles; a discharge conveyor movable in a path parallel to said first-mentioned conveyor for receiving the cans released by said rod means and conveying the same toward said can discharging station; a transporting conveyor movable at an angle to said discharge conveyor; and a discharge chute into which said discharge conveyor discharges the filled cans and which directs the filled cans onto said transporting conveyor.

References Cited in the file of this patent

UNITED STATES PATENTS

| | | |
|---|---|---|
| 1,891,830 | Nicholson | Dec. 20, 1932 |
| 2,048,156 | Gardner et al. | July 21, 1936 |
| 2,092,786 | Taylor | Sept. 14, 1937 |
| 2,180,349 | De Back | Nov. 21, 1939 |
| 2,195,882 | Christiansen | Apr. 2, 1940 |
| 2,518,757 | Coley et al. | Aug. 15, 1950 |